Patented Apr. 14, 1936

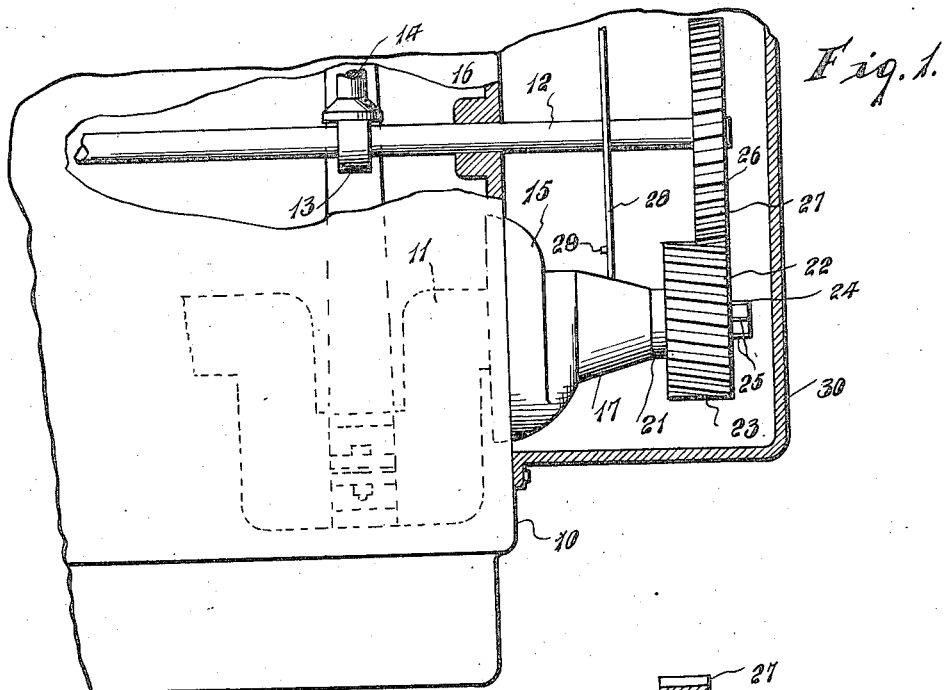
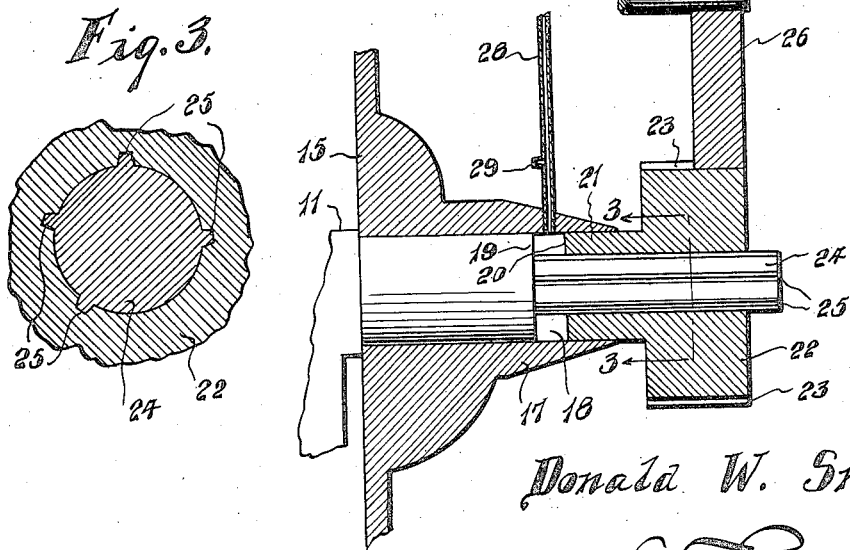

2,037,051

UNITED STATES PATENT OFFICE 2,037,051

VALVE TIMING COMPENSATOR FOR INTERNAL COMBUSTION ENGINES

Donald W. Smiley, Waterloo, Nebr.

Application May 16, 1935, Serial No. 21,875

6 Claims. (Cl. 123—90)

This invention relates to a compensator mechanism for the timing valve gear of internal combustion engines primarily of the type used for self-propelled vehicles, automobiles, trucks, and aeroplanes.

It is particularly aimed to provide a novel construction wherein the valve timing is compensated for through the movement of a gear slidable on a crank shaft and having helical gear connection with the cam shaft, the sliding of such gear being effected inwardly at low speed because of the end thrust imparted by the helical gear teeth, and the outward sliding movement of the gear at high speed being augmented by oil pressure, the chief factors to the operation of the device depending upon the pitch and design of the gears, the oil pressure and the operating speed.

The more specific objects and advantages will become apparent from a consideration of the description following taken in connection with the accompanying drawing illustrating an operative embodiment.

In said drawing:—

Figure 1 is a fragmentary side elevation, partly in section showing my improvements incorporated in an internal combustion engine;

Figure 2 is an enlarged view primarily in section, through my improvements; and

Figure 3 is a cross sectional view taken on the line 3—3 of Figure 2.

Referring specifically to the drawing, 10 designates a conventional internal combustion engine, for instance, a four cycle engine, of which 11 is the crank shaft, and 12 the rotatable cam shaft, having cams 13 thereon and controlling the inlet and exhaust valve mechanism 14 as usual. The casing of the engine contains a front main bearing 15 for the crank shaft 11 and a suitable bearing 16 for the cam shaft.

According to the invention, said main bearing is enlarged to provide a cylindrical extension 17 in the bore of which a chamber or pocket 18 is formed between the adjacent end or wall 19 of the crank shaft, and the adjacent end 20 of a sleeve extension 21 on a gear wheel 22 provided with helical gear teeth 23.

Said shaft 14 has a reduced extension at 24, which has splines 25 of any desired number provided around the same, preferably not equidistantly apart, so that the gear 22, whose bore conforms to the shape of the extension 24 may be removed and applied to such extension only in one position, thus enabling one to follow timing marks and not destroy timing when inspecting the parts. It will be understood that the gear 22 is freely slidable with the extension 21, in chamber 18 and is freely slidable along the shaft extension 24.

Said cam shaft 12 has a gear wheel 26 suitably fastened thereto and provided with helical gear teeth 27 enmeshed with the gear teeth 23.

Communicating with the chamber 18 is a pipe 28 through which lubricant is adapted to pass into the chamber 18, such pipe having an opening or jet 29 therein, relatively close to the bearing extension 17. The pipe 28 is arranged in or is a part of a pressure lubricating system for the engine, that is, one which circulates the lubricating oil from the crank case over working parts of the engine and then returns it thereto.

A case or enclosure 30 is preferably secured oil tight to the casing of the engine 10, about the gears 22 and 26 and associated parts.

As the gear 22 is materially wider than the gear 26, the end thrust of the gear 22 because of the helical teeth, causes the gear 22 to slide toward the engine and into contact with the wall 19 of the crank shaft, at low speeds. At the higher speeds, the oil under pressure, that is the extra amount of oil flowing to the pipe 28, builds up in pressure and forces the gear 22 outwardly along the shaft extension 24 until the oil can flow along this extension to the crank case, the sliding of the gear 22 thus being controlled by the speed of the engine and pressure and quantity of the oil passing through the pipe 28 and into the chamber 18. The jet or opening 29 in the pipe 28 allows such oil as encounters resistance in the chamber 18 to flow through the case 30 and drain back into the oil pan of the engine 10 for filtering and reuse or circulation.

By reason of the invention, applicant employs the lubricant passing the by-pass valve in a pressure oiling system, to force the gear 22 to travel outwardly, using the well known fact that oiling systems of the pressure type generally allow more oil to flow through the by-pass at high speeds than at low speeds. I have found the principles of the invention will effect a more perfectly timed cam shaft in a motor at all speeds.

Various changes may be resorted to provided they fall within the spirit and scope of the invention.

What is claimed:—

1. In combination, an internal combustion engine, a crank shaft, a cam shaft, a sliding gear splined to the crank shaft, a gear on the cam shaft, said gears having intermeshing helical teeth, and means operable by pressure of circulating lubricant within the engine to actuate the first mentioned gear axially at higher engine speeds to advance the rotation of the cam shaft.

2. In combination, an internal combustion engine, a crank shaft, a cam shaft, a sliding gear splined to the crank shaft, a gear on the cam shaft, said gears having intermeshing helical teeth, and means operable by pressure of circulating lubricant within the engine to actuate the first mentioned gear axially at higher engine speeds to advance the rotation of the cam shaft, said means having an opening for the return of oil to the crank case located short of its discharge end.

3. In an internal combustion engine, in combination with the crank shaft and cam shaft, a gear slidably splined on the crank shaft, a gear on the cam shaft, said gears having intermeshing helical teeth, a chamber into which a portion of the first mentioned gear extends, and conduit means to convey lubricant from the engine under pressure into said chamber.

4. In an internal combustion engine, in combination with the crank shaft and cam shaft, a gear slidably splined on the crank shaft, a gear on the cam shaft, said gears having intermeshing helical teeth, a chamber into which a portion of the first mentioned gear extends, conduit means to convey lubricant from the engine under pressure into said chamber, and said conduit means having an outlet opening short of said chamber to return lubricant to the crank case of the engine.

5. In an internal combustion engine, in combination with the crank shaft and cam shaft, a gear slidably splined on the crank shaft, a gear on the cam shaft, said gears having intermeshing helical teeth, a chamber into which a portion of the first mentioned gear extends, conduit means to convey lubricant from the engine under pressure into said chamber, said conduit means having an outlet opening short of said chamber to return lubricant to the crank case of the engine, a bearing for said crank shaft in which said chamber is provided and into which a portion of the first mentioned gear extends, and said conduit being connected to said bearing.

6. In an internal combustion engine, in combination with the crank shaft and cam shaft, a gear slidably splined on the crank shaft, a gear on the cam shaft, said gears having intermeshing helical teeth, a chamber into which a portion of the first mentioned gear extends, conduit means to convey lubricant from the engine under pressure into said chamber, said conduit means having an outlet opening short of said chamber to return lubricant to the crank case of the engine, a bearing for said crank shaft in which said chamber is provided and into which a portion of the first mentioned gear extends, said conduit being connected to said bearing, the first mentioned gear wheel being wider than the other gear wheel, and a crank shaft at one end thereof having a reduced portion provided with splines, and the first mentioned gear having a bore corresponding in shape to the crank shaft extension and slidable thereon.

DONALD W. SMILEY.